(12) United States Patent
Kirsch

(10) Patent No.: US 6,690,978 B1
(45) Date of Patent: Feb. 10, 2004

(54) GPS SIGNAL DRIVEN SENSOR POSITIONING SYSTEM

(76) Inventor: Jerry Kirsch, 1559 S. Riverside 3-A, St. Clair, MI (US) 48079

( * ) Notice: Subject to any disclaimer, the term of this patent is extended or adjusted under 35 U.S.C. 154(b) by 0 days.

(21) Appl. No.: 09/348,486

(22) Filed: Jul. 7, 1999

Related U.S. Application Data (60) Provisional application No. 60/092,221, filed on Jul. 8, 1998, now abandoned.

(51) Int. Cl.[7] .............................................. G05B 19/18
(52) U.S. Cl. ............................. 700/56; 700/60; 700/66; 701/213; 701/300
(58) Field of Search ............................. 700/56, 60, 59, 700/61–66, 57, 58, 141, 83–85; 382/141, 103; 356/5.01, 139.04–139.08; 346/12, 13, 58; 348/64, 135, 211, 2, 169–172; 250/203.1–203.7; 701/25, 213, 3, 216, 300

(56) References Cited

U.S. PATENT DOCUMENTS

| | | | |
|---|---|---|---|
| 3,700,801 A | * 10/1972 | Dougherty | 348/169 |
| 4,053,929 A | * 10/1977 | Collins et al. | 348/170 |
| 4,497,065 A | * 1/1985 | Tisdale et al. | 382/103 |
| 4,979,093 A | * 12/1990 | Laine et al. | 700/61 |
| 5,155,684 A | * 10/1992 | Burke et al. | 701/25 |
| 5,408,537 A | * 4/1995 | Major | 382/141 |
| 5,434,614 A | * 7/1995 | Dainty | 348/64 |
| 5,557,397 A | * 9/1996 | Hyde et al. | 356/5.01 |
| 5,589,901 A | * 12/1996 | Means | 396/12 |
| 5,617,762 A | * 4/1997 | Kirsch | 74/490.06 |
| 6,034,722 A | * 3/2000 | Viney et al. | 348/135 |
| 6,172,747 B1 | * 1/2001 | Houlberg | 356/139.04 |

* cited by examiner

Primary Examiner—Leo Picard
Assistant Examiner—Steven R. Garland
(74) Attorney, Agent, or Firm—Dykema Gossett PLLC (57) ABSTRACT

The subject of the invention relates to a positioning system having a control that integrates a GPS receiver for determining the system's operating coordinates. The control can interface with either radio or cellular telephone transceivers, or receivers for receiving GPS coordinate data via remote radio or cellular transceivers or senders, in order to process the local GPS coordinate data using logarithms for solving triangles with various geometrical propositions to establish and control the sensor positioner and to automatically maintain a sensor fix on remote objects or vehicles transmitting their GPS coordinates. The positions control is configured with a target operating mode that permits an operator to manually steer the positioner to desired positions at which information is desired, and to engage the control to make use of, at targeted time, positioner angular data stemming from the positions dive assemblies encoders to automatically maintain a sensor fix on desired targeted positions. In addition, the positions control is configured with a coordinate entry mode that permits an operator to engage the controller to automatically position the positioner in order to maintain a sensor fix on the entered coordinates. The positioning system functions to either maintain a sensor fix on stationary or moving objects from either a stationary position or a moving object or vehicle.

6 Claims, 14 Drawing Sheets

GPS Signal Driven Sensor Positioner

Camera Angle Of View

| | 12 X Zoom | | 24 X Zoom | | | |
|---|---|---|---|---|---|---|
| | (Wide End) | (Tel. End) | (Wide End) | Tangent | (Tel. End) | Tangent |
| | Degrees | Degrees | Degrees | 1/2 Angle | Degrees | 1/2 Angle |
| Horizontal | 48.8 | 4.3 | 41.4 | 0.3387 | 3.7 | 0.03434 |
| Vertical | 37.6 | 3.3 | 31.7 | 0.79072 | 2.8 | 0.68937 |

Camera Resolution

| | Elements |
|---|---|
| Horizontal | 615 |
| Vertical | 575 |

GPS Position Resolution Accuracy

| | |
|---|---|
| Meters | 2 |
| Feet | 6.56 |

24 X Zoom Horizontal Coverage

| Distance From Target (Feet) | (Wide End) Horizon Coverage Feet | (Tel. End) Horizon Coverage Feet | (Wide End) Times Greater Than GPS Accuracy | (Tel. End) Times Greater Than GPS Accuracy | (Wide End) 25' Object Percentage Monitor Consumed | (Tel. End) 25' Object Percentage Monitor Consumed | (Wide End) Picture Elements Per Foot | (Tel. End) Picture Elements Per Foot |
|---|---|---|---|---|---|---|---|---|
| 100 | 68 | 7 | 10 | 1 | 37% | 364% | 9.08 | 89.55 |
| 200 | 135 | 14 | 21 | 2 | 18% | 182% | 4.54 | 44.77 |
| 300 | 203 | 21 | 31 | 3 | 12% | 121% | 3.03 | 29.85 |
| 400 | 271 | 27 | 41 | 4 | 9% | 91% | 2.27 | 22.39 |
| 500 | 339 | 34 | 52 | 5 | 7% | 73% | 1.82 | 17.91 |
| 600 | 406 | 41 | 62 | 6 | 6% | 61% | 1.51 | 14.92 |
| 700 | 474 | 48 | 72 | 7 | 5% | 52% | 1.30 | 12.79 |
| 800 | 542 | 55 | 83 | 8 | 5% | 46% | 1.13 | 11.19 |
| 900 | 610 | 62 | 93 | 9 | 4% | 40% | 1.01 | 9.95 |
| 1000 | 677 | 69 | 103 | 10 | 4% | 36% | 0.91 | 8.95 |
| 1100 | 745 | 76 | 114 | 12 | 3% | 33% | 0.83 | 8.14 |
| 1200 | 813 | 82 | 124 | 13 | 3% | 30% | 0.76 | 7.46 |
| 1300 | 881 | 89 | 134 | 14 | 3% | 28% | 0.70 | 6.89 |
| 1400 | 948 | 96 | 145 | 15 | 3% | 26% | 0.65 | 6.40 |
| 1500 | 1016 | 103 | 155 | 16 | 2% | 24% | 0.61 | 5.97 |
| 1600 | 1084 | 110 | 165 | 17 | 2% | 23% | 0.57 | 5.60 |
| 1700 | 1152 | 117 | 176 | 18 | 2% | 21% | 0.53 | 5.27 |
| 1800 | 1219 | 124 | 186 | 19 | 2% | 20% | 0.50 | 4.97 |
| 1900 | 1287 | 130 | 196 | 20 | 2% | 19% | 0.48 | 4.71 |
| 2000 | 1355 | 137 | 207 | 21 | 2% | 18% | 0.45 | 4.48 |

Target In Miles

| | | | | | | | | |
|---|---|---|---|---|---|---|---|---|
| 0.25 | 1320 | 894 | 91 | 136 | 14 | 3% | 28% | 0.69 | 6.78 |
| 0.5 | 2640 | 1788 | 181 | 273 | 28 | 1% | 14% | 0.34 | 3.39 |
| 0.75 | 3960 | 2683 | 272 | 409 | 41 | 1% | 9% | 0.23 | 2.26 |
| 1 | 5280 | 3577 | 363 | 545 | 55 | 1% | 7% | 0.17 | 1.70 |

GPS SIGNAL DRIVEN SENSOR POSITIONING SYSTEM

RELATED APPLICATIONS

This application claims the benefit of U.S. Provisional application Ser. No. 60/092,221, filed Jul. 8, 1998, hereby incorporated by reference, now abandoned.

CROSS-REFERENCE TO RELATED PATENTS

U.S. Pat. No. 5,617,762 entitled "Miniature Positioning Device" issued Apr. 8, 1997, of common assignee herewith, incorporated herein by reference.

TECHNICAL FIELD

The subject of the invention relates to a sensor positioning system that makes use of GPS coordinate data for controlling the positioning device while operating from a moving vehicle. Sensors, such as cameras and light emitters, gather information from operator entered coordinates, and from moving objects or vehicles transmitting their GPS coordinates.

BACKGROUND ART

Present remote camera positioners are manually controlled to position via a joy stick giving an operator the ability to tilt and pan to desired locations. Some remote camera positioners permit making use of a joy stick to teach the positioner to automatically move between programmed points for gathering information. Present camera positioners are not sensitive to compensate for vehicle movement, or mast sway due to wind conditions, nor are they responsive to GPS coordinate signals for establishing and keeping a camera fix on moving objects and vehicles.

SUMMARY OF THE INVENTION AND ADVANTAGES

The sensor positioning system of the present invention is comprised of a two axis positioner having a mounting base adapted for coupling with a gimbaled platform which supports and maintains the positioner in a relationship with that of the horizon. A system control processor permits setting various operating modes. A manual mode permits an operator to make use of a joy stick to manually control the camera positioner, a gimbaled platform, and a mast for elevating the positioner. In the "Remote GPS coordinate" mode, the system interfaces with a GPS receiver for discerning coordinates from which the system is operating and a radio or telephone transceiver for receiving GPS coordinates transmitted from remote objects and vehicles. Remote GPS receiver coordinates received via the systems transceiver and the operating systems GPS coordinates are processed with calculations using logarithms for solving triangles with various geometrical propositions to establish and maintain a sensor fix on objects or vehicles transmitting their GPS coordinates. An "enter coordinates" mode, permits an operator to enter coordinates from which image information is desired. System GPS coordinate data and operator entered coordinates are processed for steering the positioner to establish and maintain a sensor fix on entered coordinates. A "Target" mode can be used in cases where the latitude and longitude are unknown. This operating mode permits an operator to make use of the joy stick to point a video camera or light emitter to visually, establish a target from which information is desired. Once targeted, the operator can depress a button to capture and store vector data in computer memory. (At time targeted data) is comprised of information such as; GPS coordinate, operating height, and positioner yaw and pitch angles. Target data stored in memory is used for processing trigonometric functions with succeeding system GPS coordinates. The sensor positioners pitch and yaw drive assemblies are driven in accordance with processed data for keeping the sensor positioner aimed at the targeted coordinate.

In addition the system can interface with various sensors and instruments, making the system sensitive to various applications such as, operating from an aircraft.

Some of the advantages of the present invention over the prior art is the ability to control an object positioner based on GPS coordinates received while operating from a moving vehicle, and to automatically and accurately position sensors for gathering information from desired fixed coordinates, as well as moving objects and vehicles transmitting their GPS coordinates. The invention can be applied in search in rescue operations for making and maintaining visual contact with vessels or persons in distress. The system can automatically position a camera having a zoom lens to make visual contact from distances extending beyond human visual capability. The system makes it possible for vessels and persons in life jackets equipped with transmitters integrated with GPS receivers to transmit their GPS coordinates, giving rescuers the ability to illuminate and maintain a magnified camera fix on those in distress, to more safely and efficiently approach them The system provides a means for gathering imaged information in land surveying, and construction monitoring applications, were areas and object coordinates can be automatically established and recorded for future visual reference.

FIGURES IN THE DRAWINGS

Other advantages of the present art will be readily appreciated as the same becomes better understood by reference to the following detailed description when considered in connection with the accompanying drawings-and diagrams wherein:

FIG. 33 is a chart representative of the performance capability of the camera lens in the present invention.

DETAILED DESCRIPTION OF THE PREFERRED EMBODIMENT

Figures 1, 6, 21:
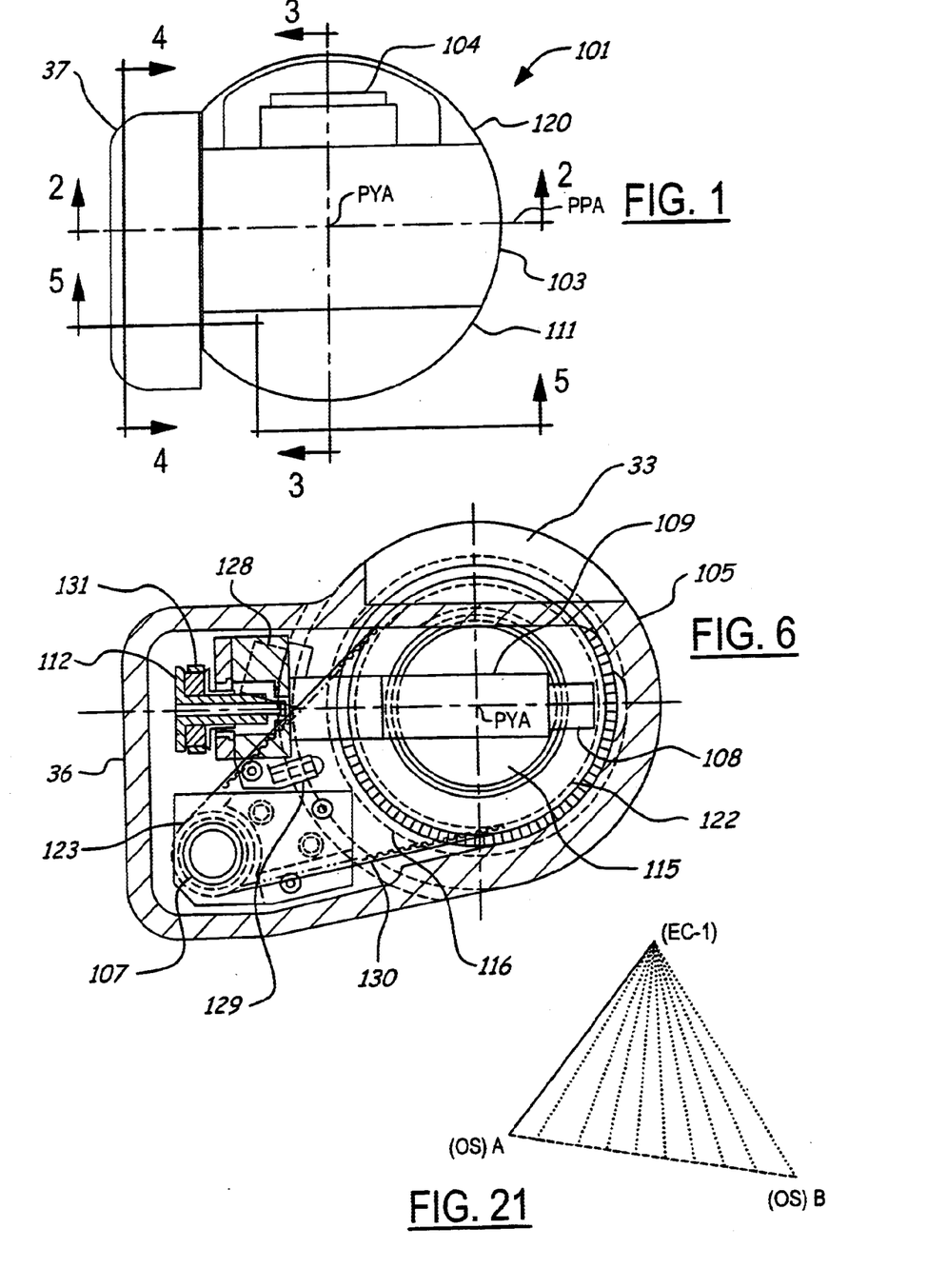
FIG. 1 is a plan view of two axis camera positioner.
FIG. 6 is a cross section extending through the positioners yaw drive assembly.
FIGS. 21 through 30 are charts depicting various positioner movements and related to coordinates.

Referring to FIG. 1, camera positioner 101 is comprised of a spherical shaped pitch wheel 103 which houses camera 104. Protective camera lens and access covers 120 and 111 conform with the wheels shape. Camera 104 is attached to gather information from within positioners pitch wheel 103. The centerlines of the cameras array are located in alignment with axis PPA and PYA.

Figure 2:
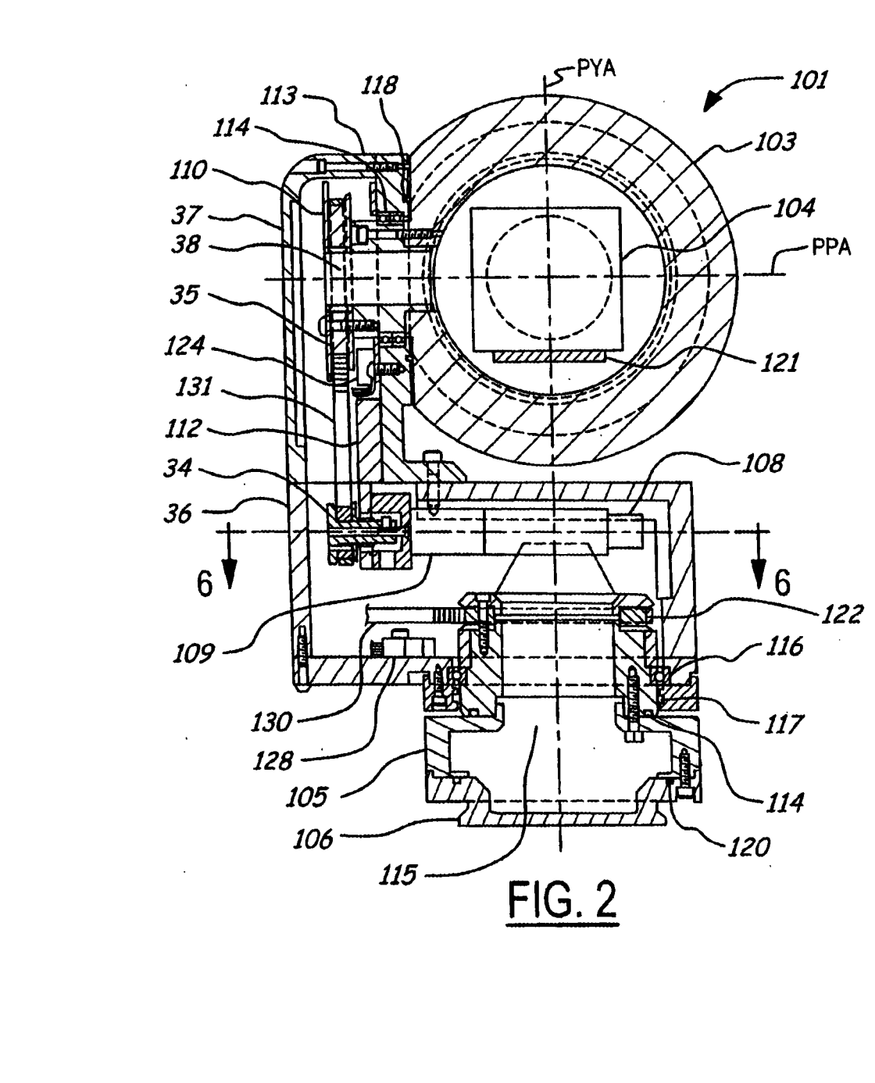
FIG. 2 is a cross of the positioner extending from port to starboard.

Referring to FIG. 2, pitch drive assembly 109 imparts movement to pitch wheel 103 for tilting camera 104 about the positioners pitch axis PPA. Optical encoders 108 of both pitch and yaw drive assembly motors are used for controlling yaw and pitch angles, and positioning speeds. Preferably the positioner is with the capabilities covered in patent '762, giving the ability to pitch and yaw a sensor about a center point formed by the pitch and yaw axis, making programming easier than with positioners having offset joints. Pulleys 34 and 35 and timing belt 131 connect with pitch wheel 103, rotably coupled to pitch support 113 via bearings 114. Mounting plate 112 supports drive assembly 109 to work from a position within yaw table 36. Yaw table 36 is rotably coupled to yaw mounting base 105 via yaw bearing 116. Mounting base 105 employs a flange 106 that permits the positioner to be quickly connected to the gimbaled platform of the invention. Yaw pulley 122 couples with mounting base 105, giving traction for yawing drive assembly via timing belt 130. Camera 104 is coupled to bracket 121 in alignment with the positioners yaw axis "PYA" and Pitch axis "PPA" Opening 38 permits camera cables to extend from wheel 103, and on into mounting base cavity 115. Dynamic O-ring seals 117, and 118, and static seals 119, 120 are used for weather proofing the positioner.

Figure 3:
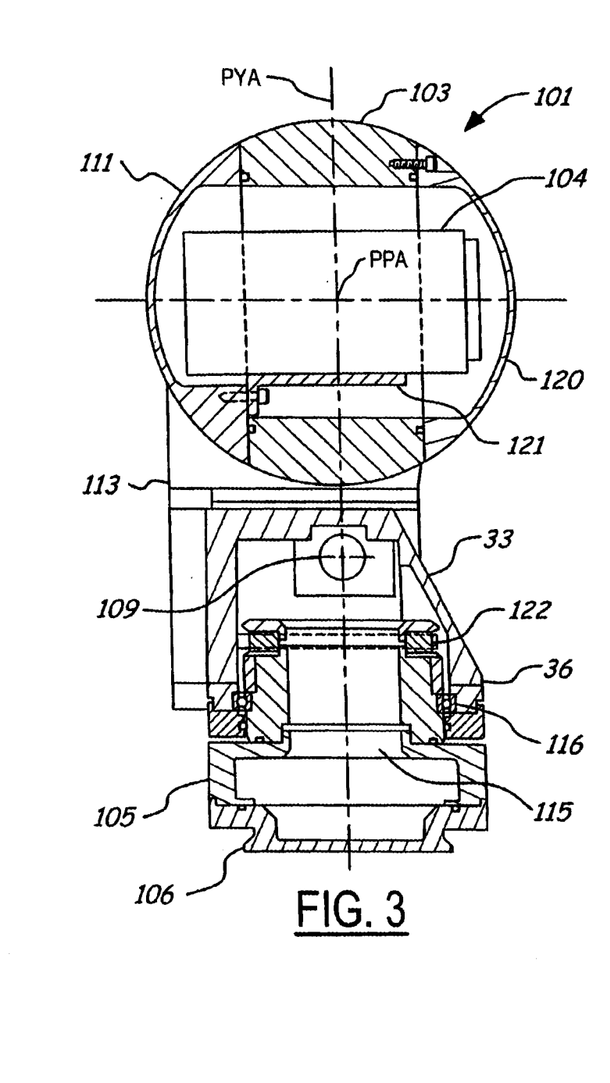
FIG. 3 is a cross section extending from aft to forward of the positioner.

Referring to FIG. 3 Yaw table 36 has a taper 33 that extends the cameras downward viewing range when pitched downward about axis PPA.

Figure 4:
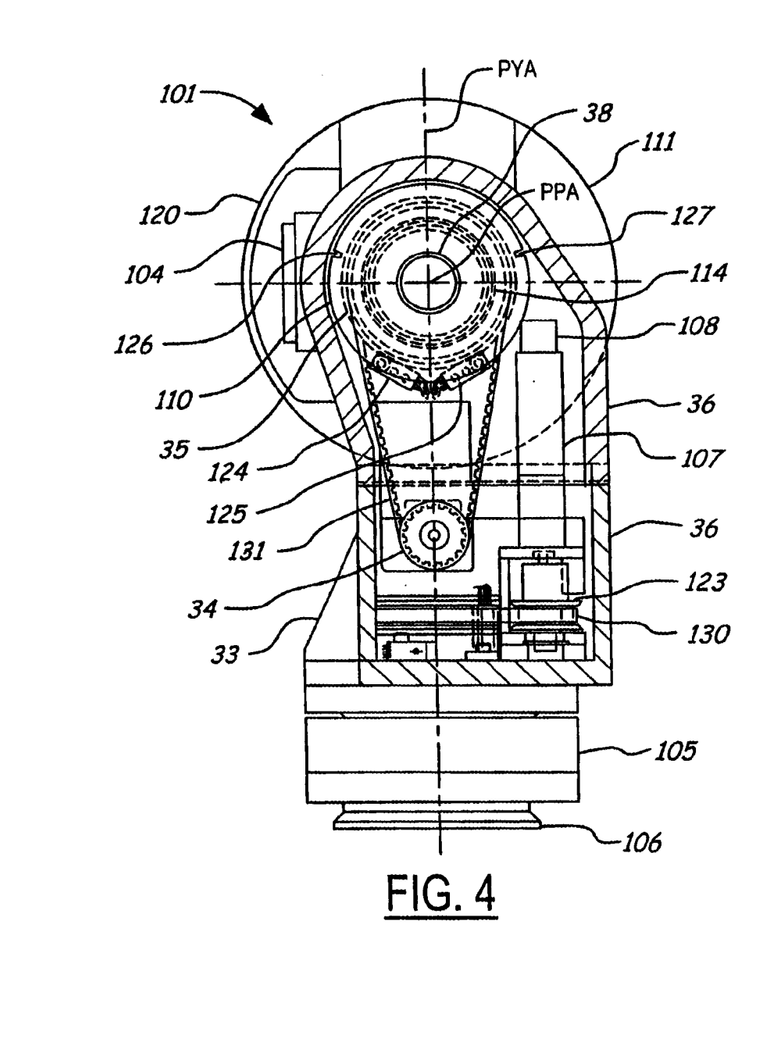
FIG. 4 is a cross section extending through the positioners pitch drive assembly.
Figure 5:
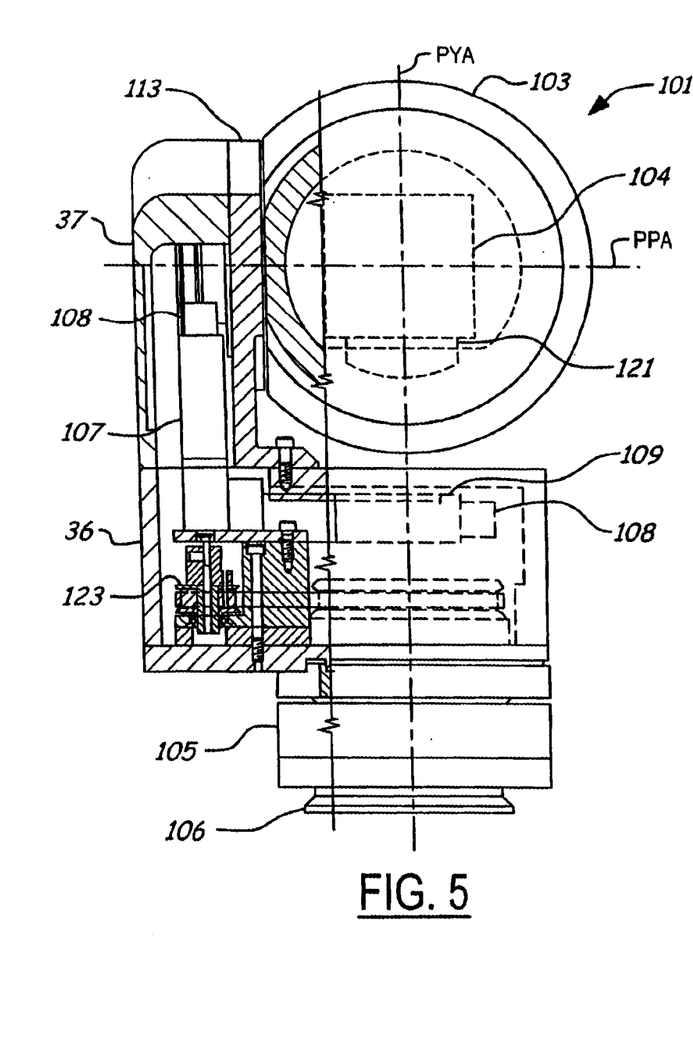
FIG. 5 is a partial cross section and front elevation.

Referring to FIGS. 4 and 5, sensors 124 and 125 are used for detecting maximum pitch movement. As pulley flange 110 revolves about axis PPA, notches 126 and 127 trigger sensors 124 and 125, detecting the limits. Yaw drive assembly 107 couples with yaw base 36, and drive assembly 107 imparts yaw movement via its associated pulleys and timing belt 130, traverses with the yaw table 36 about PYA.

Referring to FIG. 6, yaw optical sensors 128 and 129 are coupled to yaw table for detecting maximum yaw movement.

Figure 7:
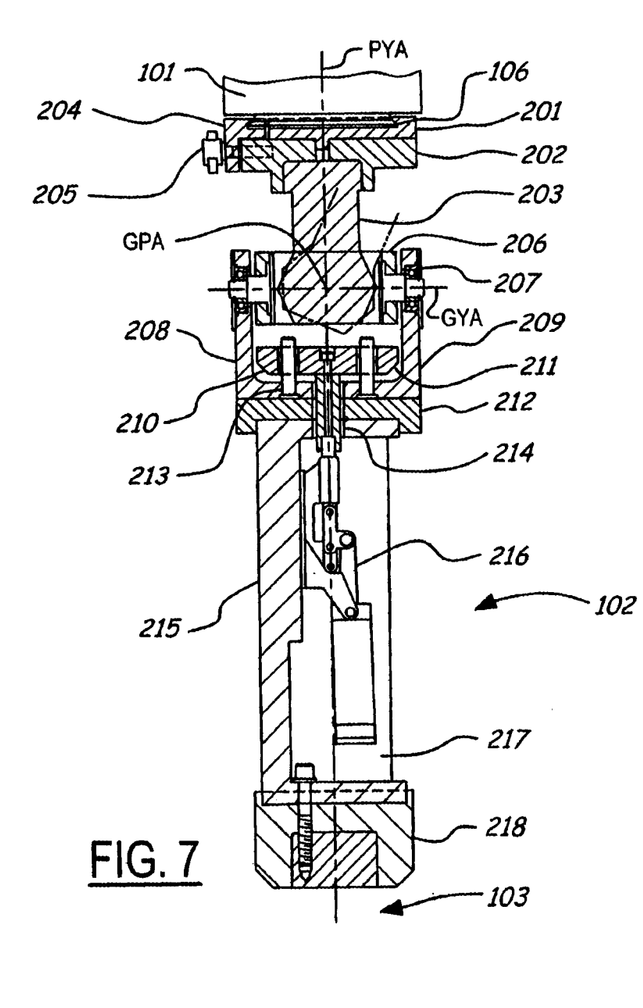
FIG. 7 is a cross section extending from forward to aft of a gimbaled platform.

Referring to FIG. 7, gimbaled platform 102 is driven to offset vehicle movements to maintain positioner 101 in a horizontal relationship with that of the horizon. Platform 102 is comprised of a "U" shaped positioner mounting base retainer 201 attached to gimbaled platform 202, permitting camera positioner flange 6 to slideably mate with retainer 201, and locked into position by bracket 204 with knobs 205. Platform 202 is adapted for coupling with pitch gimbal frame 203. Yaw frame 206 is rotably coupled via bearings 207 to gimbal support flanges 208 and 209 attached to gimbal table 212, allowing yaw movement about gimbal yaw axis GYP. Gimbal clamping plate 211 is slideably held in position by guide pins 213 and bushings 210. A fluid powered locking clamp 216, and clamp rod extension 214 are coupled to clamping plate 211. Power clamp 216 can be energized to vertically move the clamping plate upward to engage with the pitch and yaw gimbal frames. Clamp 216 is housed in slot 217 of riser 215 allowing for vertical movement in alignment with the intersection formed by PPA and GYA axis. Clamp 219 permits locking the platform during system shut down. Riser 215 can be coupled to an elevating mast system 3 via mast connecting adapter 218.

Figure 8:
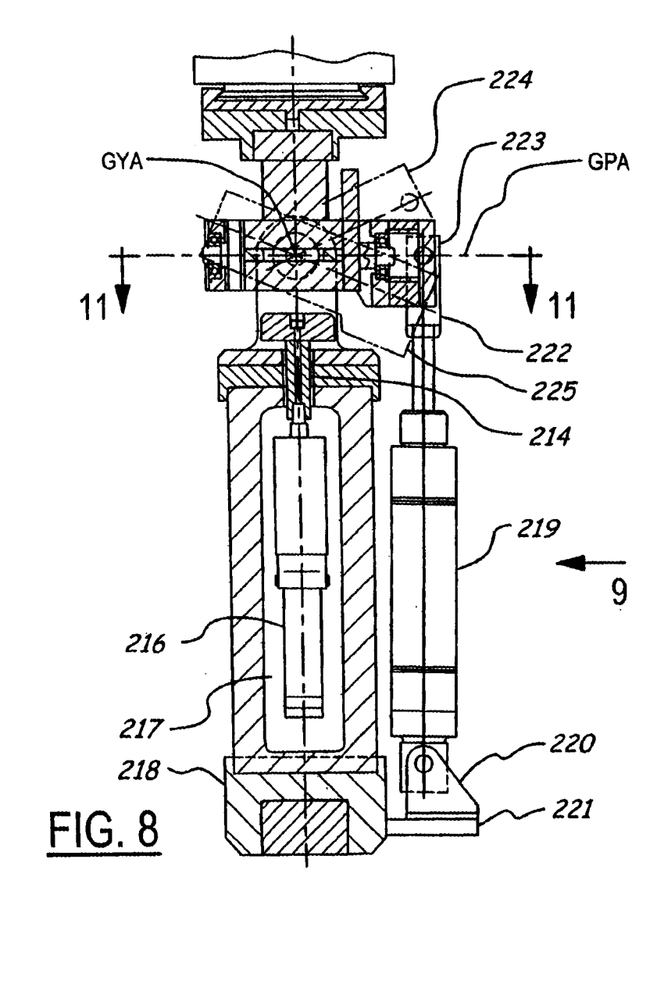
FIG. 8 is a cross section extending from port to starboard of the gimbaled platform.

FIG. 8 illustrates how pitch gimbal frame 203 is rotably coupled to yaw gimbal frame 206. Yaw drive assembly 219 is attached at its lower end to pivot bracket 220 for mounting to flange 221 extending from connecting adapter 218. Platform pitch and yaw drive assemblies are comprised of a linear fluid power cylinder with position feedback for controlling linear displacement and speed. Drive assembly rod end clevis 222 rotably couples with yaw frame pivot 223, allowing the drive assembly to impart yaw movement extending to angles depicted with phantom lines at 224 and 225.

Figure 9:
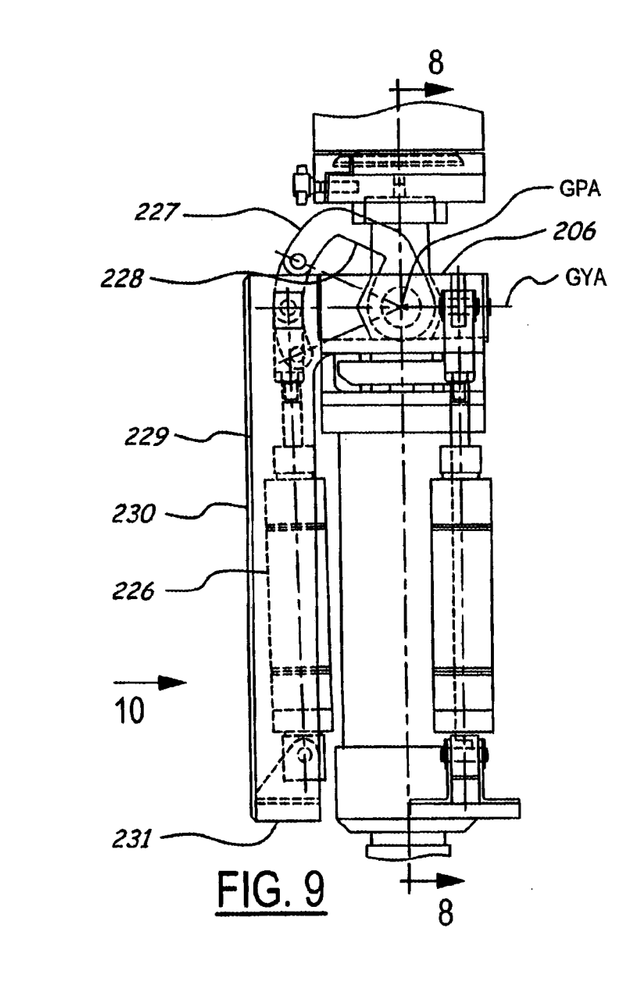
FIG. 9 is a port side elevation of the gimbaled platform.

Referring to FIG. 9, Platform pitch drive assembly 226 is clevis mounted to flange 231 of pitch frame extension 229. Flange 231 is supported by strut 230. Pitch clevis link 227 is shaped to prevent surface 228 from making contact with gimbal yaw frame 206 when pitched to aft.

Figure 10:
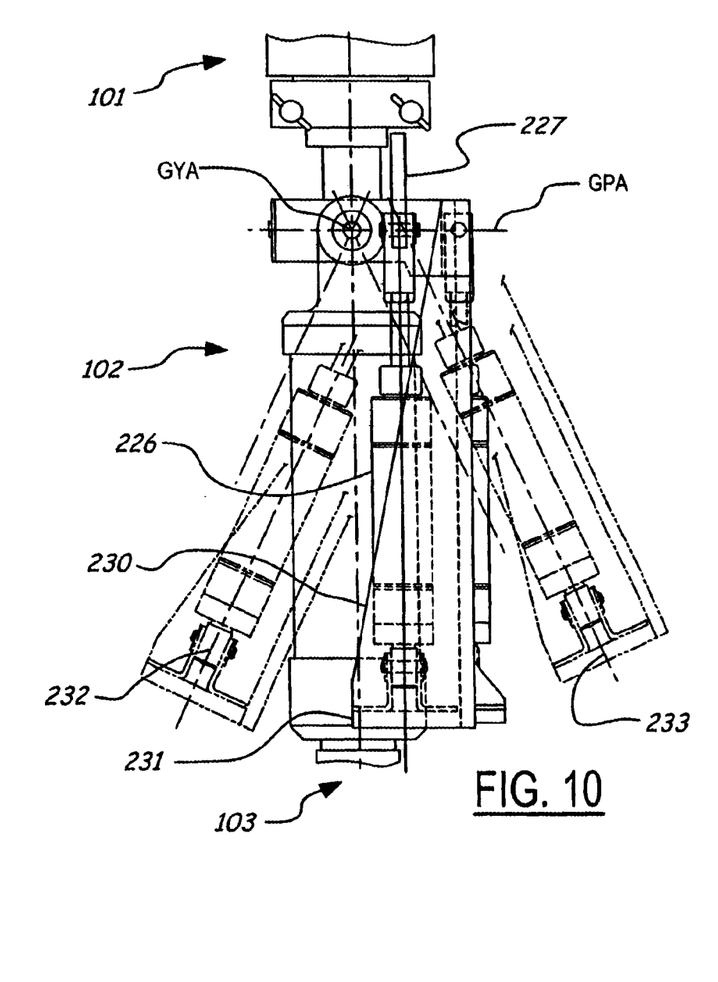
FIG. 10 is an aft elevation of the gimbaled platform.

FIG. 10 illustrates angular movement of pitch drive assembly 226 as related to changing yaw gimbal angles depicted with phantom lines at 232 and 233.

Figure 11:
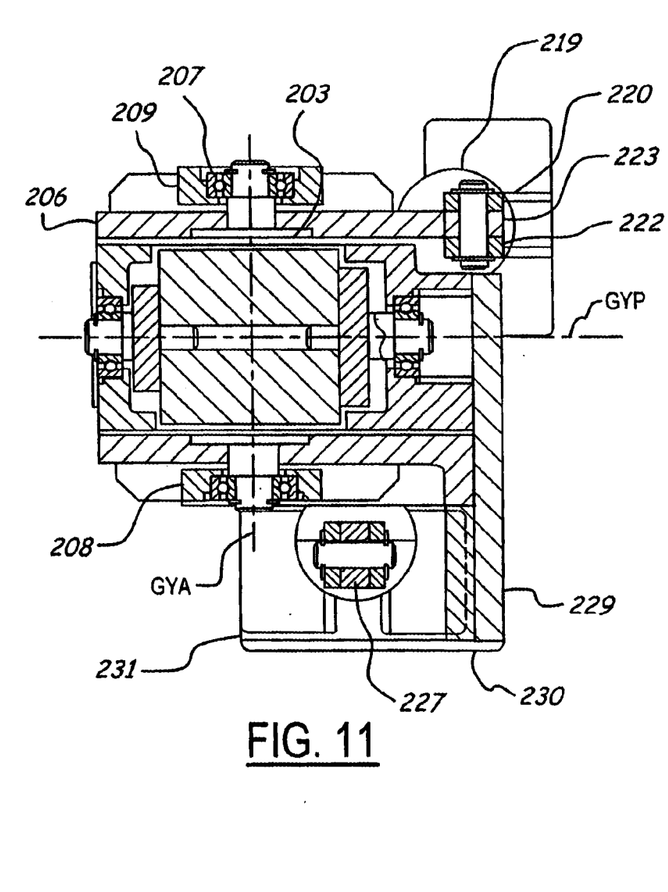
FIG. 11 is a cross section extending horizontally through the platform gimbal.

FIG. 11 is a cross section illustrating how drive assemblies are coupled to their respective gimbal framework.

Figure 12:
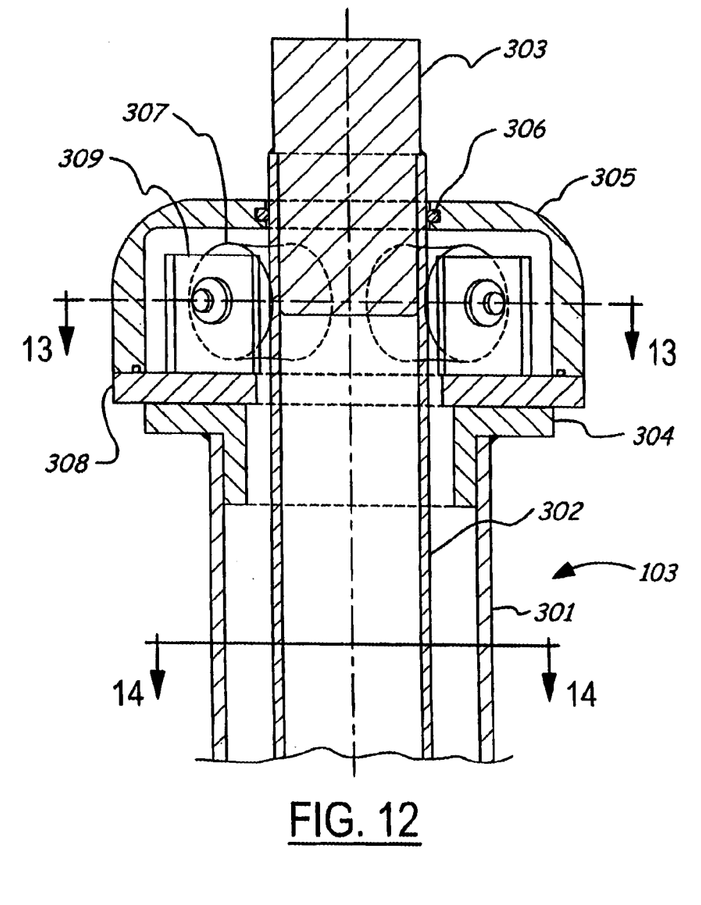
FIG. 12 is a section through the upper portion or the elevating mast.

Referring to FIG. 12, elevating mast 103 permits elevating gimbaled platform 102 and camera positioner 101, for extending viewing capabilities. Tubular mast 302 is comprised of mounting adapter plug 303 at its upper end. Gimbaled platform 102 can be attached to the mast via plug 303. Mast support tube 301 employs an upper flange 304 for attaching roller mast guide assembly 308. Roller guide protective cover 305 and "O"-ring, seal 306 seal the upper portion of the elevating mast assembly.

Figure 13:
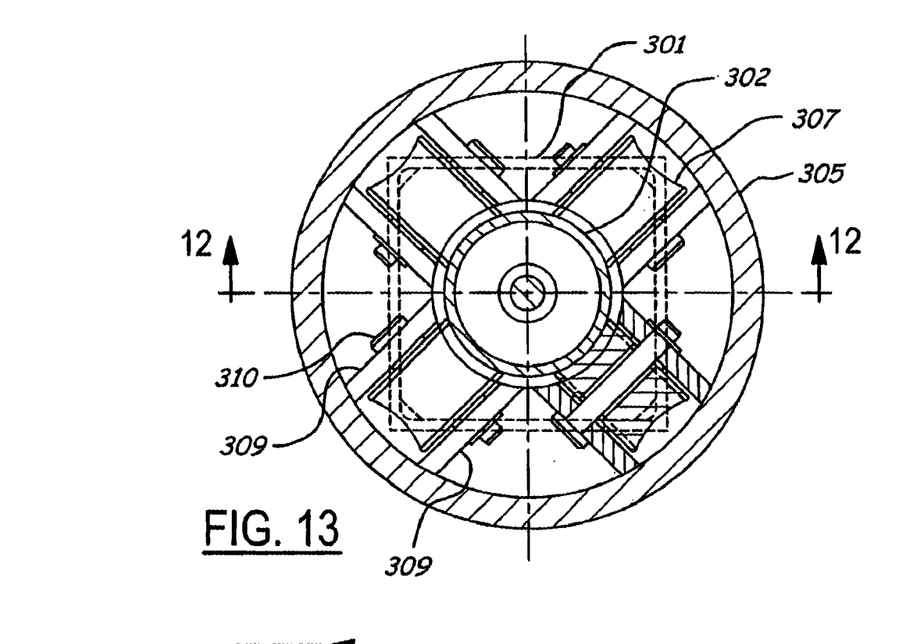
FIG. 13 is a section through the masts upper roller guide assembly.

Referring to FIG. 13, mast guide rollers 307 are held in position by roller pins 310 extending through flanges 309 of roller assembly 308. Rollers 307 act to guide elevating mast 302 at its outside diameter.

Figure 14:
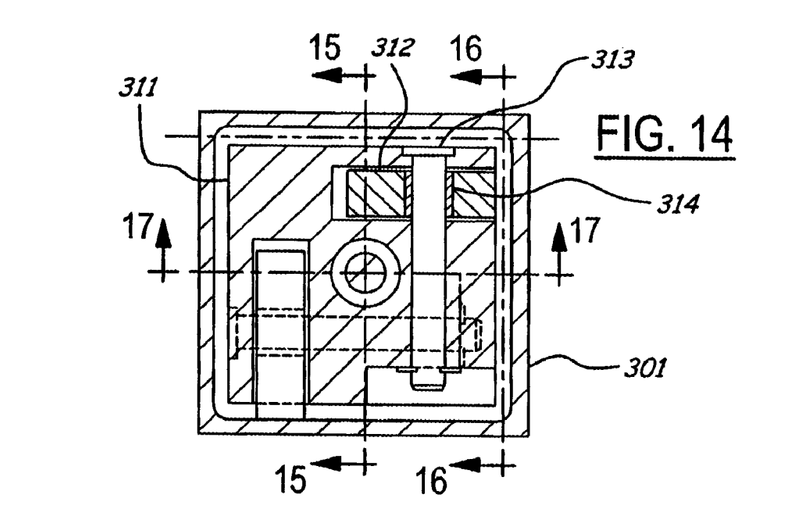
FIG. 14 is a horizontal section through the masts lower guide assembly.

Referring to FIG. 14, elevating mast lower guide is comprised of roller block 311 and rollers 312. Rollers are held in position by pins 313 and bushing 314 for making contact with the inner walls of mast support tube 301.

Figure 15:
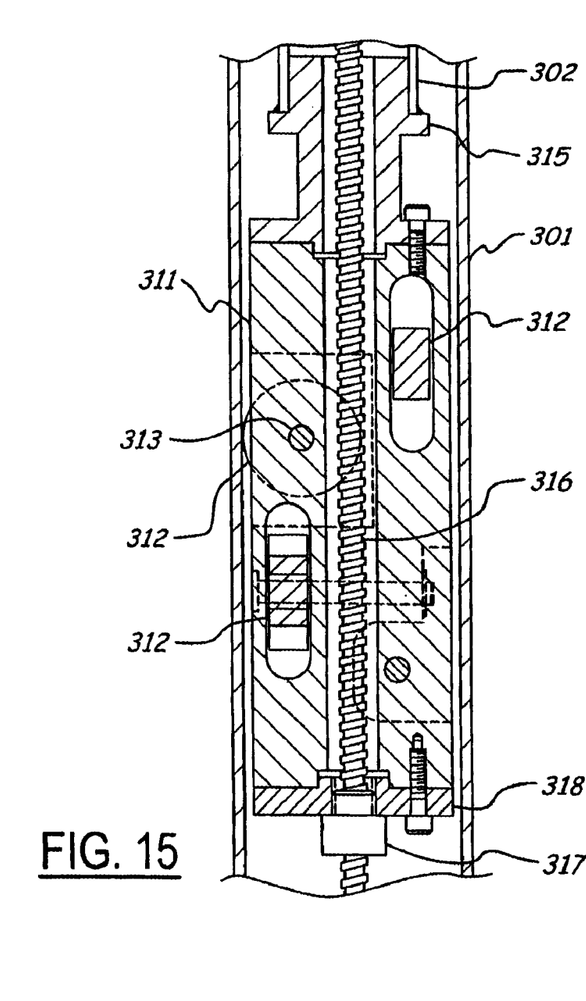
FIG. 15 is a section through the masts lower guide assembly.
Figure 16:
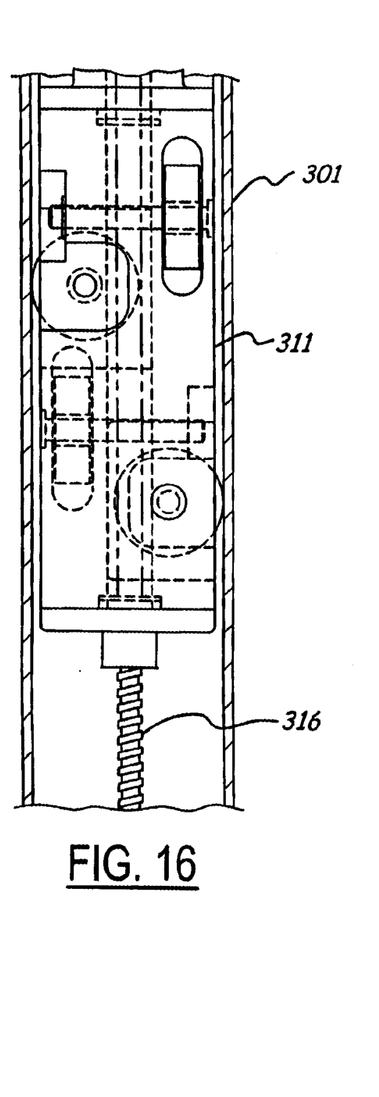
FIG. 16 is a starboard side elevation of the masts lower guide assembly.

Referring to FIGS. 15 and 16, lower elevating mast tube riser 315 attaches to elevating mast 302 for coupling the mast with lower guide block 311. Lead screw 316 and lead nut 317 are used for imparting vertical linear mast movement. Lead nut 317 is held in position by retainer 318 coupled to the lower end of lower guide block 311.

Figure 17:
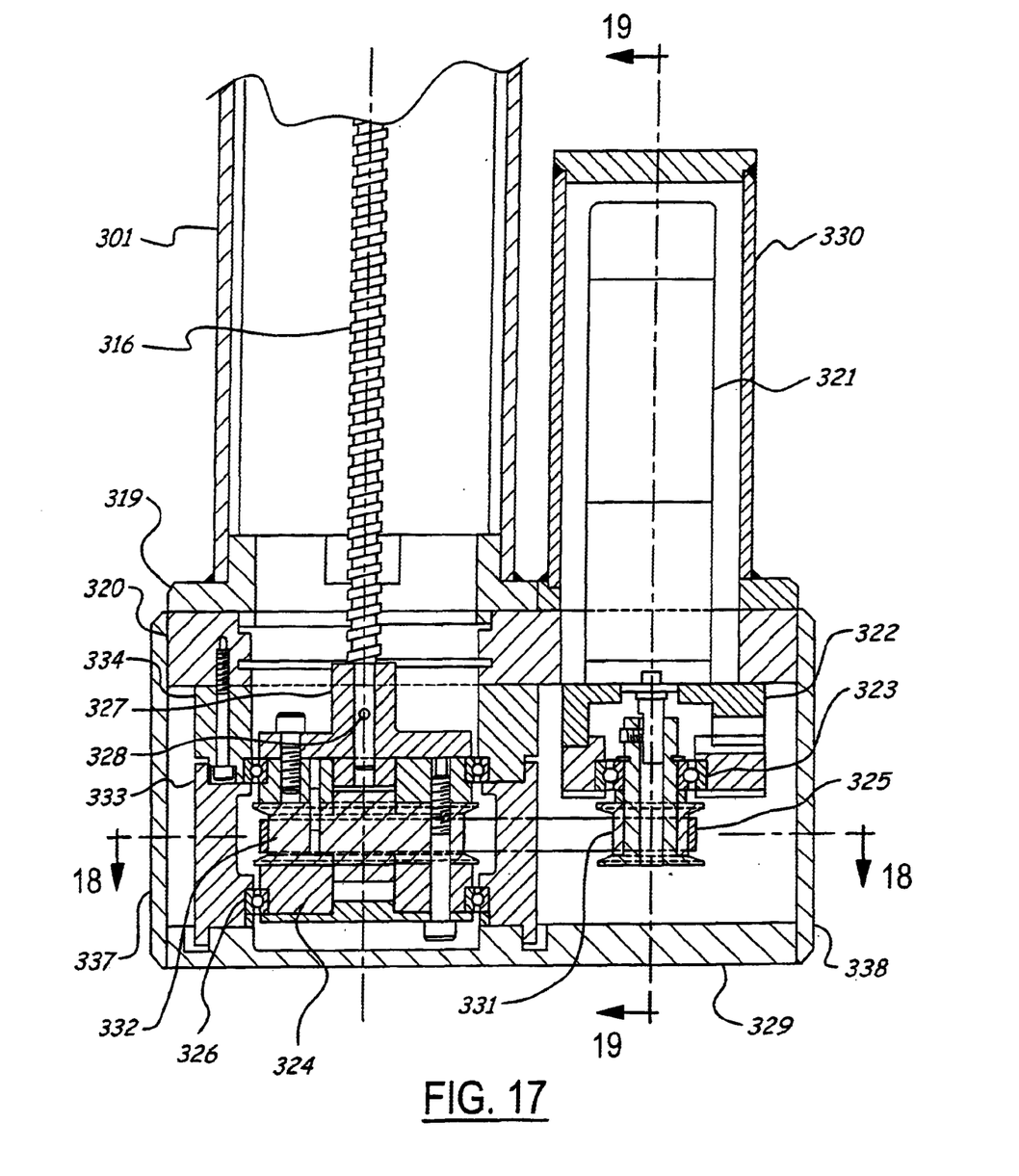
FIG. 17 is a port to starboard section through the masts drive assembly.

Referring to FIG. 17, drive assembly 321 is coupled to mounting block 322 having thrust bearing 323. Drive assembly 321 imparts movement for elevating the mast via pulleys 331, 322, timing belt 325, and lead screw 316. Pulley risers 324 are coupled to bearings 326. Risers 333 and 334 couple with the outer races of bearings 326, keeping the pulley and lead screw in alignment with the elevating masts centerline. Lead screw retainer 327 and pin 328 are used for retaining lead screw 316 to upper pulley riser 324.

Main mounting plate 320 provides means for attaching mast support tube 301, drive assembly protective cover 330, side covers 337 and 338, and lower mounting plate 329, and risers 335 and 336. Like the camera positioner 101, optical sensors can be employed to sense maximum linear mast positions.

Figure 18:
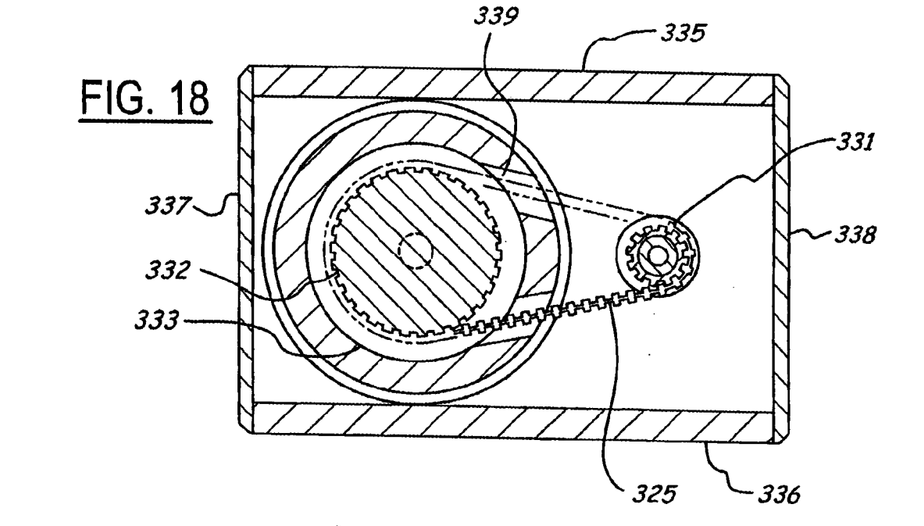
FIG. 18 is a horizontal section through the masts drive assembly.
Figure 19:
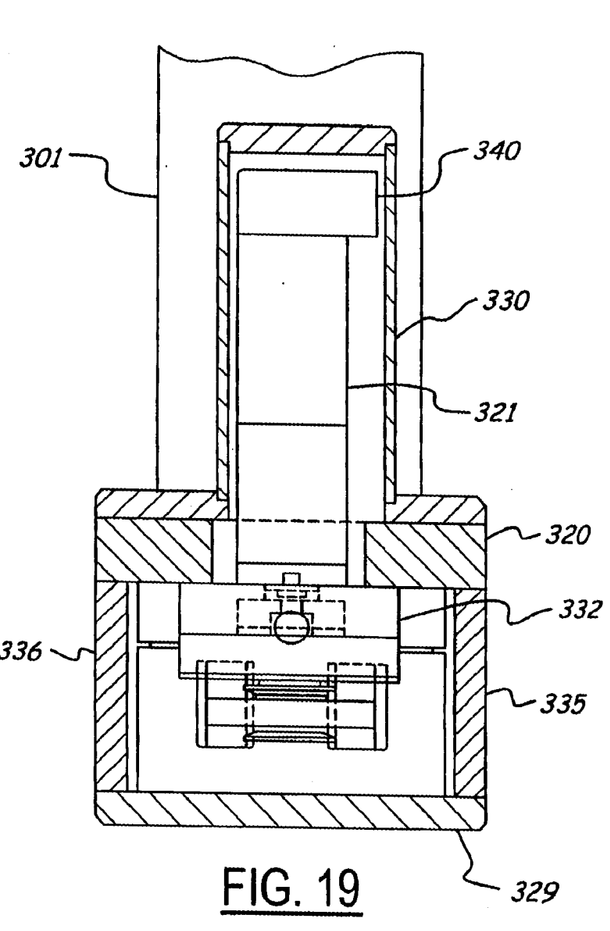
FIG. 19 is a partial elevation of the masts drive assembly.

Referring to FIG. 18, lower riser 333, has slots 339 giving passage for timing belt 325.

Figure 20:
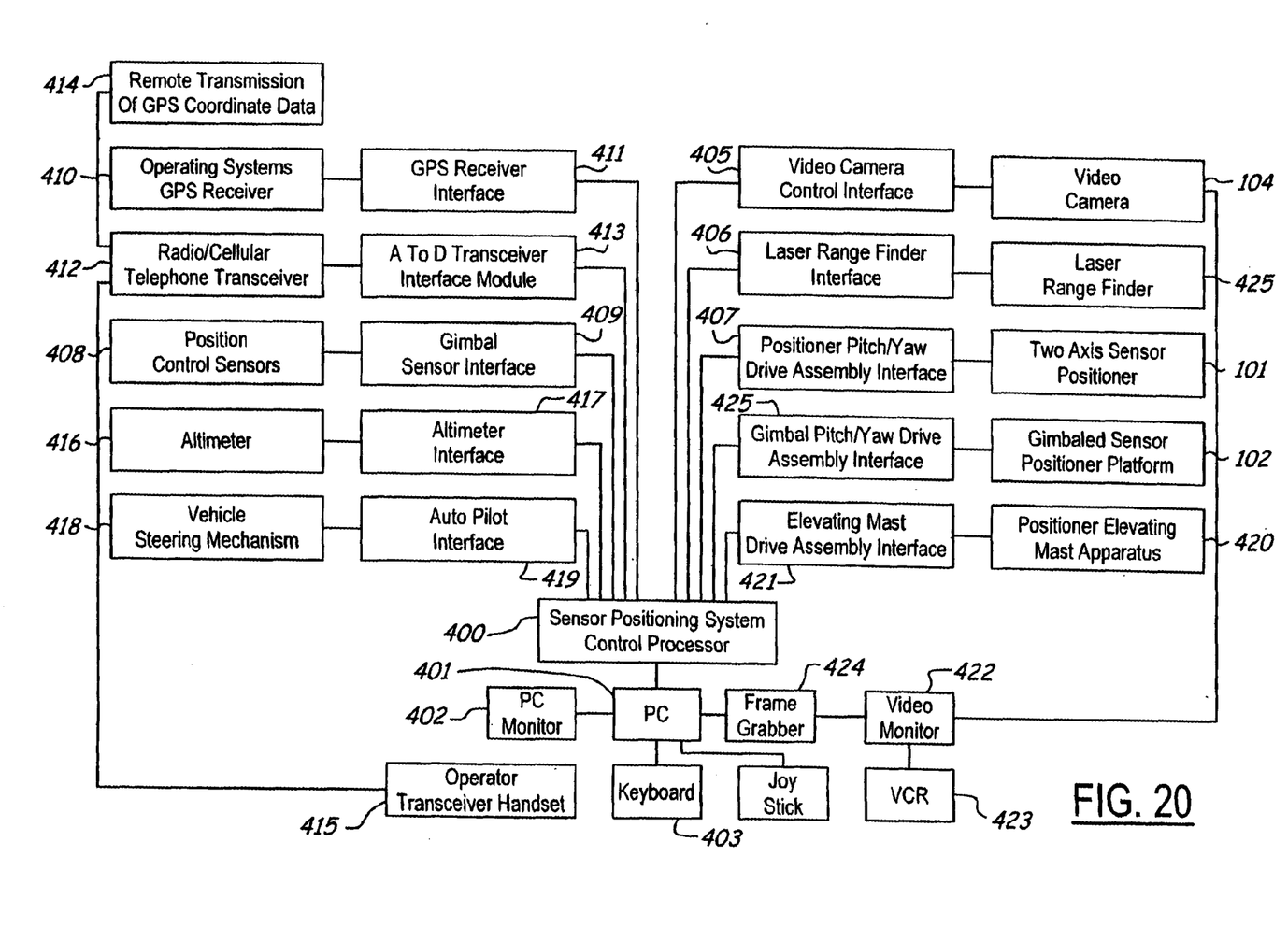
FIG. 20 is a block diagram of the system components and interfaces.

The block diagram of FIG. 20 shows sensor positioning system control processor 400 and PC 401 interfacing with various system components. PC 401 connects with monitor 402, keyboard 403, and joy stick 404, allowing for the operator to enter coordinates, and to manually control positioner 101. Positioner 101 permits coupling a video camera 104 for gathering imaged information, as well as other types of sensors such as light emitters, and laser range finders/data scopes 425. Laser range finders/data scopes can be used to accurately determine secant distances to desired targets. Camera 104, is of a type that is comprised of a X12 optical zoom with electronic imaging stabilizing capabilities, electronic X24 digital zoom, highspeed auto focus lens, and a RS232C serial control interface 405. Sony's EVI-300/331/T model has these capabilities.

Sensor positioner 101 drive assemblies optical encoders 108 give processor 400 the capability of controlling position angles and speed of positioner 101. Drive assemblies employ diffuse sensors 124 and 129 for calibrating movements when initializing the system Gimbaled platform 102 pitch and yaw drive assemblies interface with the control processor via interface 407.

Position control sensors 408 can be comprised of accelerometers and or inclinometers for measuring acceleration and angles placed on the vehicle from which the system operates. Sensor data can be outputted via interface 409 for servo positioning gimbaled platform 102, keeping it in horizontal relationship, or to output the data to computer memory for storing sensor measurement data, and to make use of stored data for processing to adaptively control the gimbaled platform 102. In addition measurements can be used to either servo adjust, or in calculations for controlling positioner 101, i.e. positioners pitch angles are adjusted in conformance with readings of the vehicles vertical accelerations While FIG. 5 depicts the gimbaled sensor positioner 102 as being driven by fluid powered linear drive assemblies having feedback capabilities, electric motor driven lead screw drive assemblies can be used to impart movement to the platform 102.

Operating systems GPS receiver 410 and interface 411 permits coordinates at which the system is operating to being delivered to control processor 400.

Transceiver 412 can be comprised of either or both a radio and cellular telephone transceiver for connecting with remote transmitters and transceivers 414. Interface 413 is comprised of a modem for modulating transmitted signals. Transceiver 412 permits receiving coordinates from remote locations 414 transmitting with transceivers interfaced with a GPS receiver. GPS coordinates received from remote transmitters or transceivers 414, are processed with GPS coordinate data received via GPS receiver 410 for steering positioner 101 to point and keep camera 104 fixed on coordinates in conformance with signals of GPS receivers 410 and 414. Operator transceiver hand-set 415 provides the means for an operator to connect with remote transceivers 414. Corrupted GPS signals received either via the operating systems interface GPS, or relayed via remote transceivers can be discarded and replaced with processed coordinates using previously received and stored coordinates in calculations for filling the voids due to corruption.

GPS supports a broad spectrum of users with different requirements. PPS, precise positioning service, intended for the military, and SPS, standard positioning service, less accurate and available to all. In marine applications, transceiver 412 can receive coordinates from remote objects or vessels transmitting coordinates received via a differential GPS connection. Differential connected signals can be received from the U.S. Coast Guard on 300 kHz marine radio beacon band, and a DBR that plugs into the GPS receiver giving positioning accuracy of approximately 10 feet.

Altimeter 416 and interface 417 can be used for gathering altitudes of an aircraft from which the positioning system is operating. This feature can also be employed to maintain a fix on aircraft transmitting their GPS and altitude coordinates. In addition, transceiver 412 can be used for transmitting processed coordinate data that include way points to remote transceivers for setting courses for steering remote vehicles to desired coordinates.

Auto pilot interface 419 can be used for delivering positioning commands to a vehicles steering mechanism 418, making it possible to automatically steer the vehicle in accordance with a continuous stream of way points generated with coordinate data streaming from two GPS receivers. In addition, control data can also be transmitted to remote vehicles giving the operating systems processor control over remote vehicles steering mechanisms.

Positioner 101 can employ an electric slip ring for making utility connections to the positioner, giving the ability to impart continuos yaw movement. To avoid the costs and size associated with electric slip rings, optical sensors can be used to detect maximum port and starboard yaw movement to avoid damaging utility cables such as wires and cables connecting with camera 104. Optical limits provide the means to discern the maximum port and yaw movement, giving the processor the ability to calibrate and set software limits. When yaw movement takes place to position either to port or starboard of the vehicle from which the system operates, and either the port or starboard software limits are made, commands are delivered to the positioners yaw drive assembly to swiftly yaw in the opposite direction of the moving target, re-engaging the target while regaining yaw positioning freedom Positioner elevating mast 103 can be elevated to various positions via joy stick 338 for gathering information with camera 104 at extend heights. Interface 421 couples control processor 400 for controlling elevating mast 102 drive assembly. Drive assembly encoder 340 is used to determine mast elevated positions for calculating pitch angle adjustments required to maintain the positioner fixed on the desired coordinate.

The operator may make use of joy stick to manually override the system control to manually manipulate positioner 101, and to return to the mode from which it was manually diverted.

While GPS receivers compute the fix in coordinate terms, latitude, longitude, and altitude, the accuracy/resolution for altitude is approximately one half that of the horizontal coordinate. In applications where the system is operating form an aircraft, higher accuracy can be achieved with system control 400 interfaced with an altimeter 416 for gathering altitudes used in calculating the pitch angles necessary for establishing and maintaining a fix. Laser range finders/data scopes 425 permit establishing secants used in computing (at time targeted heights) from which the operating is functioning.

Referring to FIG. 21, (OS) A, depicts the GPS coordinate of the operating system when an operator entered a longitude and latitude to establish coordinate (EC- 1) from which information is desired. In the course of the operating systems vehicle moving form (OS) A to (OS) B, the system makes use of the entered coordinate, and coordinates arriving via the systems interfaced GPS receiver, in calculating and making angular changes to the positioners yaw drive assembly, maintaining a yaw and pitch axis sensor fix on entered coordinate (EC- 1).

Figures 22, 23, 25:
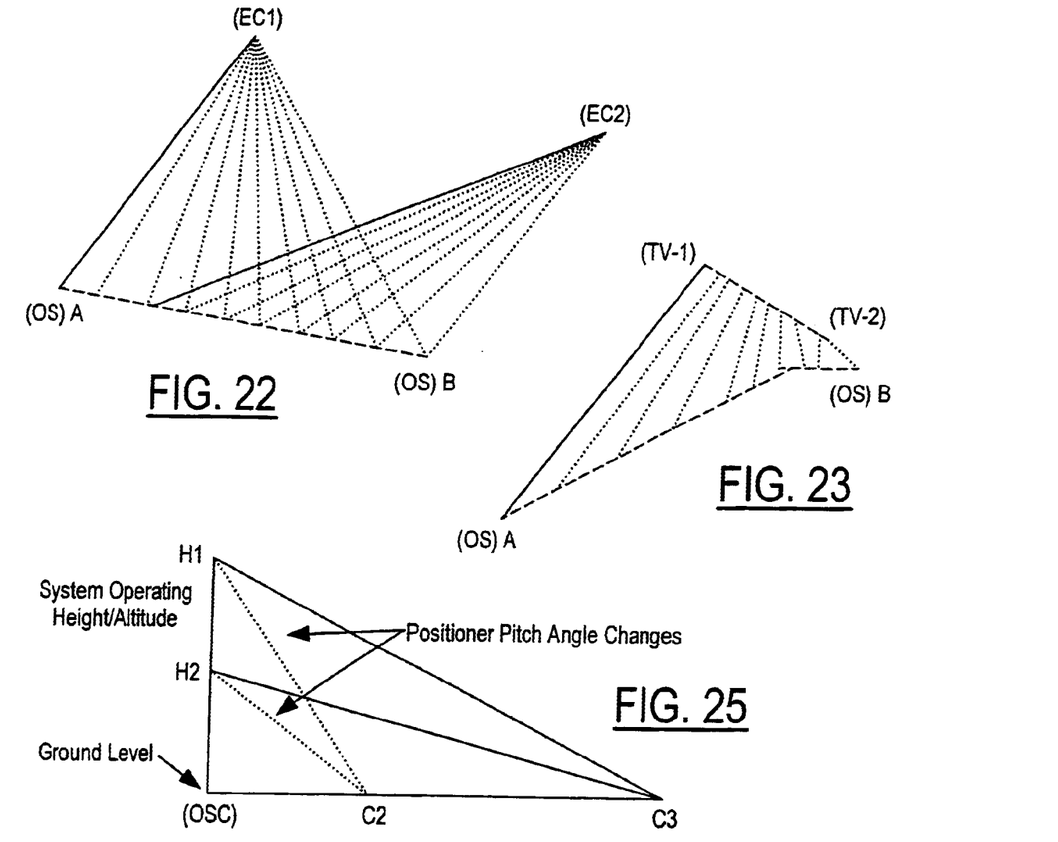

Referring to FIG. 22, adding to coordinates of FIG. 21, (EC-2) depicts another operator coordinate entry during the course of the operating vehicle moving from (OS) A and (OS) B. When gathering information from multiple coordinates, positioner dwell, times can be attached to each entered coordinate, or to being set to gather information at each coordinate for a defaulted period of time.

Referring to FIG. 23, (OS) A depicts the systems GPS coordinate when connecting with a moving vehicle transmitting its GPS coordinates at (TVI). Dotted lines depict angular yaw changes to the systems positioner while the operating systems vehicle traverses between (OS) A and (OS) B.

Figure 24:
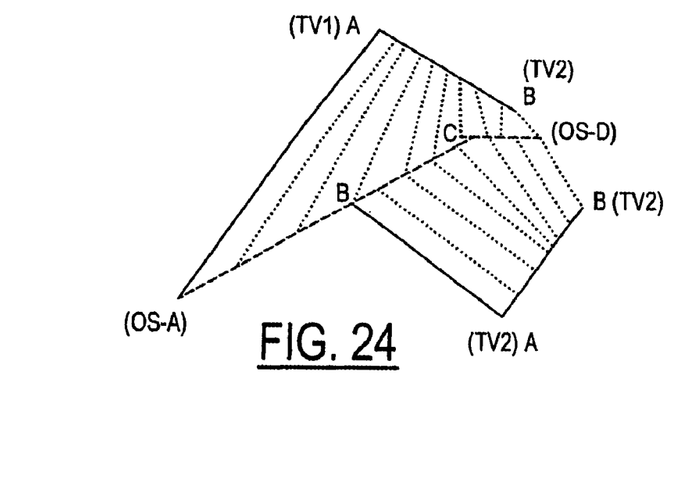

Referring to FIG. 24, adding to coordinates of FIG. 23, point B depicts a coordinate in which the system forms a connection with another moving vehicle (N2) at coordinate at point B while traversing between (OS-A) and point C. Dotted lines depict angular changes to yaw the positioner in sweeping the sensor and maintain a fix on both vehicles transmitting their GPS coordinates, while moving between B, C, and (OS-D).

FIG. 25 depicts how positioner 101 pitch angles are controlled to maintain a fix on remote coordinates (C2) and (C3) when changing heights or altitudes H1 and HZ from which the system functions over the operating systems GPS coordinate.

Figure 26:
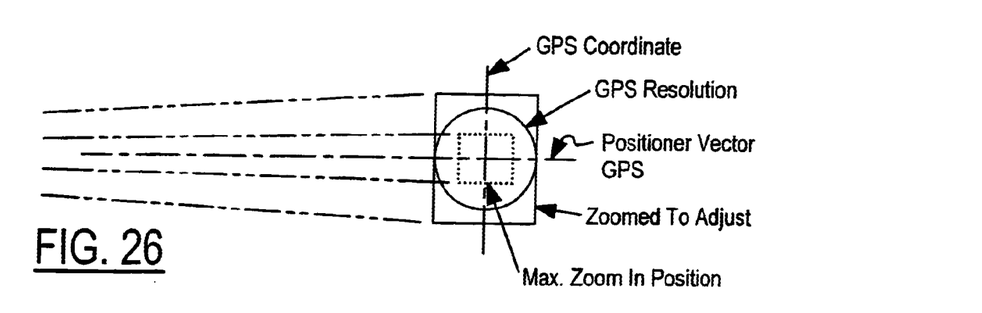

FIG. 26 depicts how the camera zoom can be controlled to expand and contract the cameras field of view in accordance with GPS resolutions/accuracy.

Figure 27:
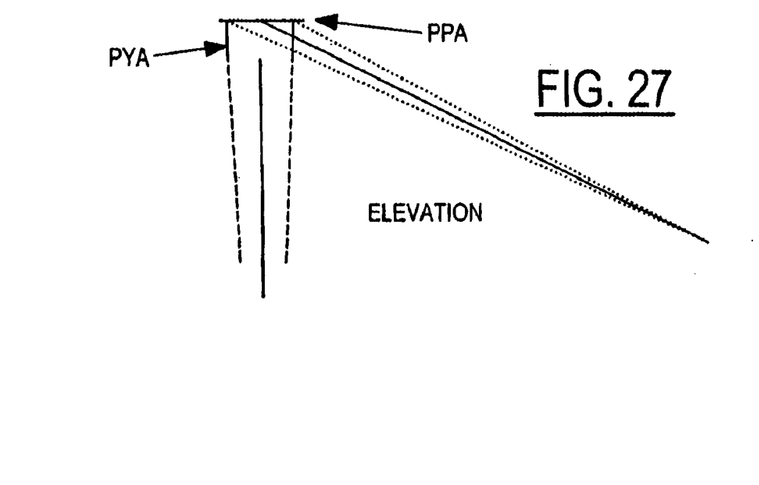

While gimbaled platform 102 maintains the positioner in a horizontal relationship, the positioners yaw axis PYA can experience changes in its parallel and longitude position due to vehicle movements. Position control sensors 408 output, can be used to compensate for such movement. FIG. 27 depicts how yaw and pitch drive assemblies are driven to compensate for vehicle movements mentioned above.

Figures 28, 31, 32:
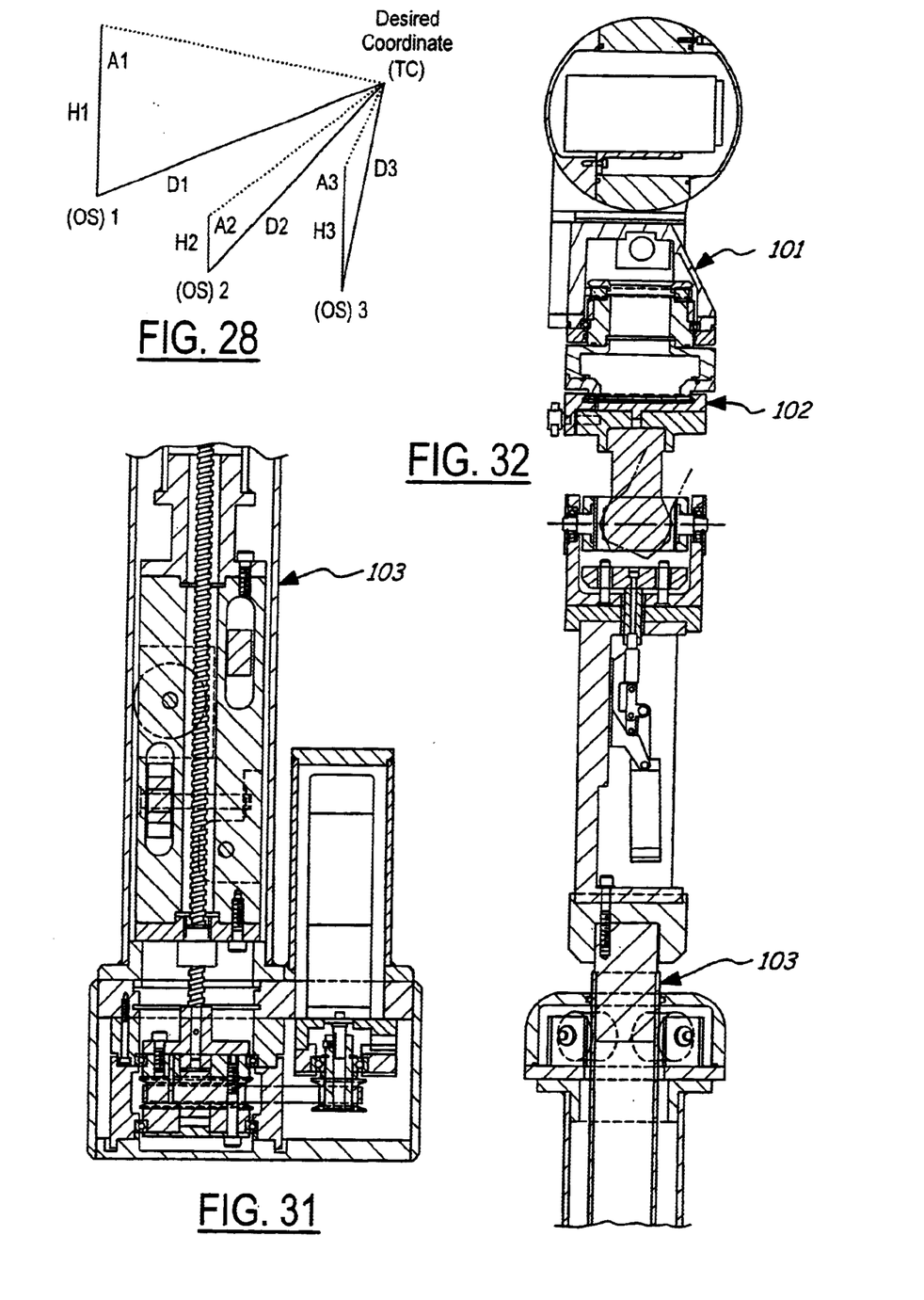
FIGS. 31 through 32 are cross sections extending from aft to forward of the entire positioning system.

Referring to FIG. 28, TC is a coordinate from which a vehicle transmits its GPS coordinates. Operating system coordinates (OS)1, 2, and 3 represent changes in the systems coordinates and associated changes in heights H, from which the sensor functions to gather information. Data is processed for changing the positioners pitch angles to maintain a fix on coordinate TC. Changes in heights are measured.

Figure 29:
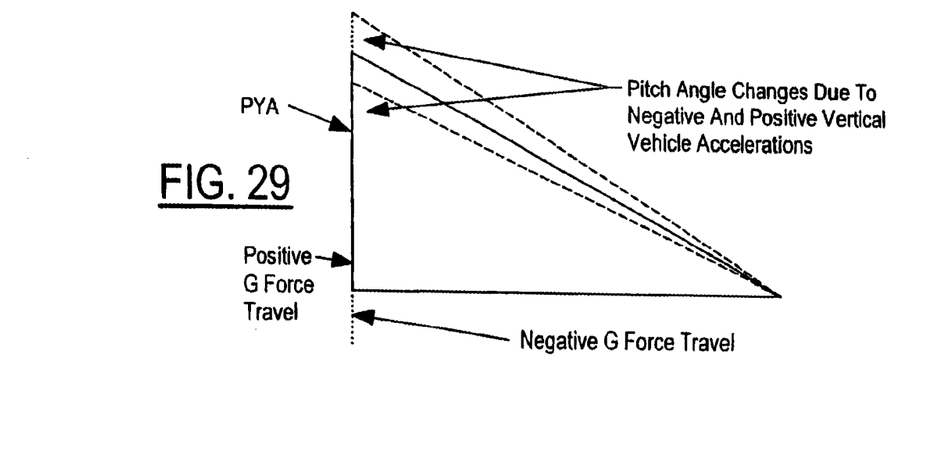
Figure 30:
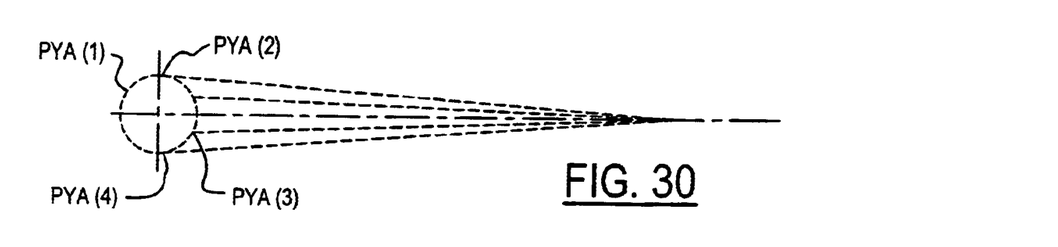

FIG. 29, depicts how the positioners pitch angles compensate for movements due vertical forces place on the vehicle.

I claim:

1. A positioning system comprising:

at least one processor;

memory operably associated with said processor;

a global positioning system (GPS) receiver capable of receiving GPS position information, and transferring said position information to said at least one processor;

a wireless communications receiver capable of receiving information transmitted from wireless transmitters and transferring said received information to said at least one processor, said information transmitted from said wireless transmitters including information associated with a position of a remote object;

a positioner, said positioner comprising a yaw table rotatably coupled to a mounting base, a pitch wheel rotatably coupled to said yaw table, a yaw drive assembly, and a pitch drive assembly; and a program of instructions capable of being stored in said memory and executed by said processor, said program of instructions enabled to calculate a relative position of said remote object, based at least in part on said GPS position information and said information associated with a position of said remote object, said program of instructions further enabled to control said positioning system based on said calculated relative position.

2. The positioning system as in claim 1, further comprising a roll assembly, said roll assembly enabled to maintain said positioning system in a generally horizontal relationship with the horizon.

3. The positioning system as in claim 1, wherein said program of instructions is further enabled to provide autopilot control for a vehicle in which said positioning system is mounted, based at least in part on said calculated relative position of said remote object.

4. The positioning system as in claim 1, further comprising an altimeter interface, and wherein said program of instructions is further configured to control said positioning system based, at least in part, on information received via said altimeter interface.

5. The positioning system as in claim 1, further comprising a range finder, and wherein said program of instructions is further configured to control said positioning system based, at least in part, on information acquired from said range finder.

6. The positioning system as in claim 1, further comprising an elevating mast, said program of instructions further configured to raise and lower said mast in response to said calculated relative position of said remote object.

\* \* \* \* \*